H. M. HERROLD & C. P. RHOADS.
AUTOMATIC HEADLIGHT ADJUSTING APPARATUS.
APPLICATION FILED FEB. 21, 1911.

998,846.

Patented July 25, 1911.

2 SHEETS—SHEET 1.

Witnesses
Frank R. Uow
H. C. Rodgers

Inventor
H. M. Herrold and C. P. Rhoads
By George Y. Thorpe Atty.

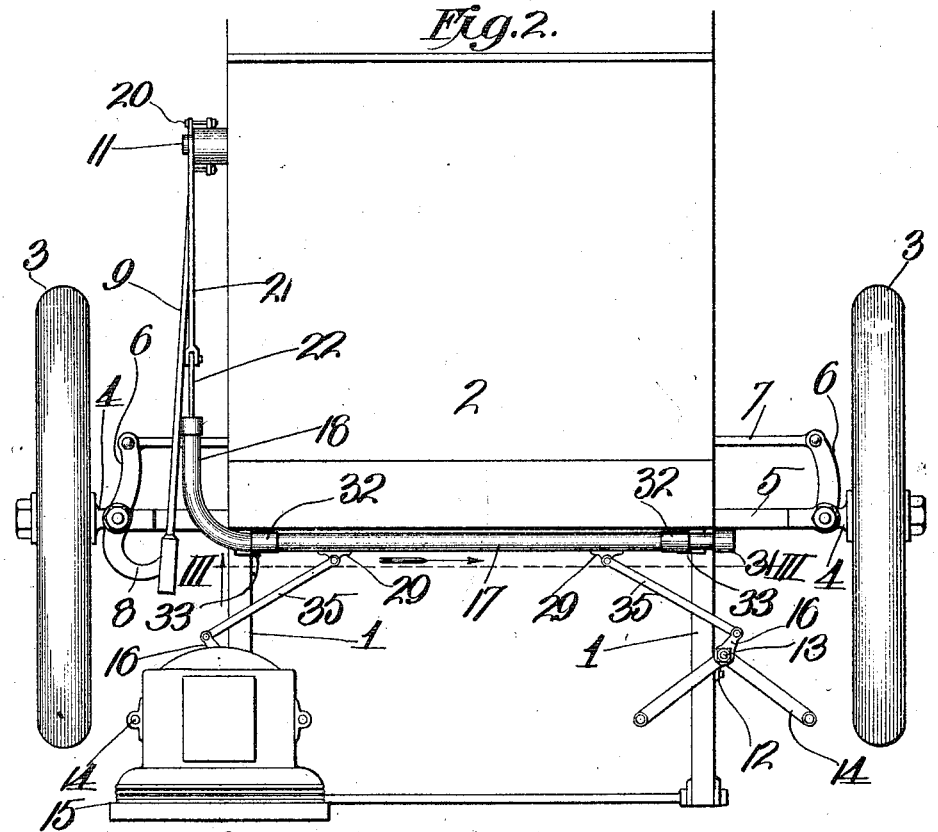
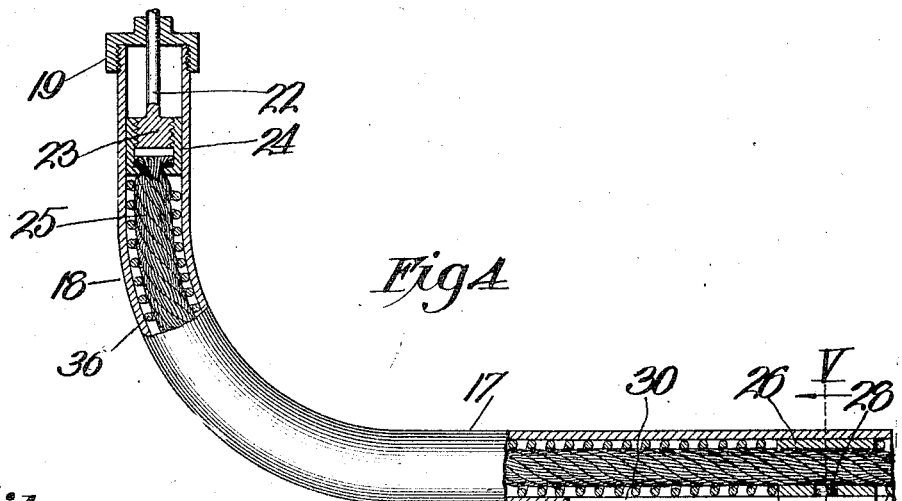

UNITED STATES PATENT OFFICE.

HERSCHEL M. HERROLD AND CRESSE P. RHOADS, OF KANSAS CITY, KANSAS.

AUTOMATIC HEADLIGHT-ADJUSTING APPARATUS.

998,846.　　　　　Specification of Letters Patent.　　Patented July 25, 1911.

Application filed February 21, 1911. Serial No. 610,059.

*To all whom it may concern:*

Be it known that we, HERSCHEL M. HERROLD and CRESSE P. RHOADS, citizens of the United States, residing at Kansas City, in the county of Wyandotte and State of Kansas, have invented certain new and useful Improvements in Automatic Headlight-Adjusting Apparatus, of which the following is a specification.

This invention relates to automatic headlight adjusting apparatus and is designed more especially for use on automobiles, our object being to produce means which can be readily and cheaply applied to an automobile, will operate efficiently and reliably and embodies the desirable features of simplicity, strength, durability and cheapness of construction.

With this object in view the invention consists in certain novel and peculiar features of construction and organization as hereinafter described and claimed; and in order that it may be fully understood reference is to be had to the accompanying drawings, in which—

Figure 1:
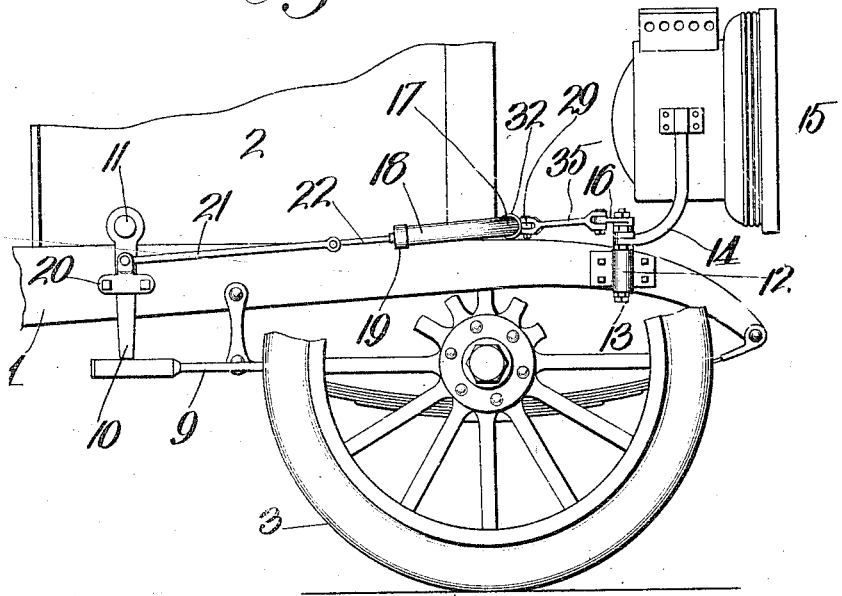
Figure 3:
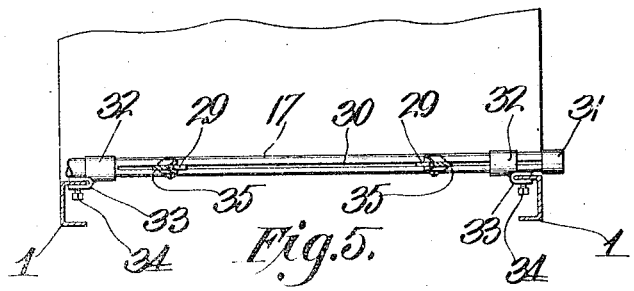
Figure 5:
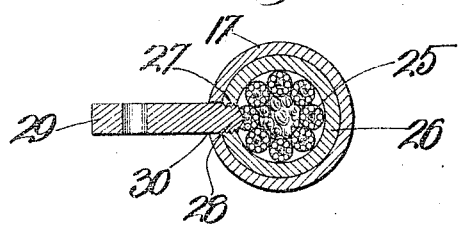

Figure 1, is a side view of the front end of an automobile equipped with apparatus embodying our invention. Fig. 2, is a top plan of the same. Fig. 3, is a vertical section on the line III—III of Fig. 2. Fig. 4, is an enlarged view partly in plan and partly in central horizontal section, of a part of the apparatus. Fig. 5, is a cross section on a still larger scale, taken on the dotted line V of Fig. 4.

In the said drawings, 1 indicates the parallel longitudinal beams of the chassis, 2 the radiator and 3 the front wheels of an automobile.

4 are the customary steering knuckles pivoted to opposite ends of the stationary axle 5.

6 are arms projecting rearward from the steering knuckles and connected by a transverse rod 7.

8 is an arm projecting forwardly and inwardly from one of the knuckles. 9 is a rod connecting said arm with the depending crank arm 10 of a shaft 11, adapted to be turned by the manipulation of the steering wheel (not shown) of the machine, all of the parts thus far described being of common and well known construction and arrangement.

12 are bearings secured to the front ends of beams 1 and 13 vertical shafts or pivots mounted in said bearings and equipped with the customary brackets 14 carrying the lamps 15, constituting the head lights, and projecting rearwardly from the upper ends of the shafts or pivots 13 are arms 16.

17 is a tube extending transversely of the machine and in most cases arranged above the beams 1 and adjacent to the radiator 2. At one end the tube terminates in an elbow 18 and said end is closed by a cap 19.

20 is a clamp mounted on arm 10 of shaft 11, and pivoted at its rear end to said clamp is a link 21 pivoted at its front end to a rod 22, extending slidingly through cap 19, into the elbow-shaped end of tube 17. Said rod terminates at its front end in a threaded head or enlargement 23 and secured upon said head is a cap 24 to which is firmly attached the rear end of a cable 25, or any equivalent device which will not shorten under a reasonable application of force applied endwise upon it. This cable fits loosely in the tube and secured rigidly upon it at opposite sides of and equal distances from the longitudinal center of the machine, are collars 26 which are capable of sliding endwise in the tube 17 but are incapable of movement in any other direction.

28 are clamping screws extending through the collars and impinging on the cable to fasten said parts rigidly together, and the collars are provided with wide horizontally-arranged heads 29, which fit slidingly in the slot in the forward side of tube 17, extending from a point adjacent to the elbow through the body of the tube to the extremity thereof, and normally closing said end is a removable cap 31.

For supporting the tube 17 in place, we employ a pair of collars 32 which fit tightly on said tube and are carried by horizontally arranged U-shaped clips 33 fitting upon beams 1 and secured rigidly thereon by set screws 34.

The connections between the endwise movable part or cable and the arms 16 of the lamp yoke is by means of links 35 which are pivoted at their rear ends to the heads 29 of bolts 28, and at their front ends to said arms 16.

To avoid any possibility of the flexible part 25 buckling under endwise pressure applied upon it, it is necessary to provide means to fill the space between it and the tube, which means is preferably in the form of helical springs 36 and 37, the former bearing at its opposite ends against the flanged cap 24 and the adjacent collar 26, and the other being arranged between said collar and the companion collar, both spacers being capable of sliding within the tube with the endwise movable part or cable.

It being assumed that the collars have been secured on the cable at the proper points, the cable equipped with the cap 24 is slipped into the tube through the right hand end of the same so that the heads 29 of the screws 28, shall enter the slot 30. The cable is moved until the cap 24 projects beyond the opposite end of the tube and then the head of rod 22 screwed into the cap and pivotally attached to the clamp. The caps 19 and 31 are then screwed on the ends of the tube and the links 35 are pivotally connected to the collars. When the steering wheel is operated to turn the machine to the right arm 10 swings forward and in such movement through the connections described imparts endwise movement to the cable in the direction indicated by the arrow Fig. 2, so that the connections between the cable and the lamps shall cause the latter to turn in the same direction as the wheels and thus illuminate the path which the machine will follow, this projection of the light, not only enabling the person in charge of the machine to see ahead of him but also warning any one around the turn that the machine is approaching. When the steering wheel is turned in the opposite direction to turn the machine to the left, the endwise movement of the cable is reversed and the lamps are caused to face to the left.

From the above description it will be apparent that we have produced an automatic headlight adjusting apparatus embodying the features of advantage enumerated as desirable and we wish it to be understood that while we have illustrated and described the preferred embodiment of the invention we wish it to be understood that we reserve the right to make all changes properly falling within the spirit and scope of the appended claims.

We claim:—

1. The combination with an automobile having a depending swinging arm, a headlight and a laterally-movable supporting bracket for the headlight, of a tube extending transversely of the machine and provided with a slot and terminating at one end in a curved portion, an endwise-slidable device in said tube, a part secured to said device, means rigid with said part and slidable in said slot, a movement-transmitting connection between said means and said bracket, and connections between said device at the curved end of the tube and said swinging arm, whereby movement of the latter in opposite directions shall impart endwise movement to said device in opposite directions.

2. The combination with an automobile having a depending swinging arm for movement in a plane parallel with the longitudinal center of the machine, a headlight and a laterally-movable supporting bracket for the headlight, of a tube extending transversely of the machine and provided with a slot and terminating at one end in a rearwardly curved portion, an endwise slidable device in said tube, a collar on said device, means rigid with the collar and slidable in said slot, an obliquely-extending link pivotally connecting said means and said bracket, a suitably guided rod projecting into the curved end of the tube, and a link pivotally connecting said rod and said swinging arm.

3. The combination with an automobile provided with a headlight pivoted for lateral movement, of a suitably supported tube extending transversely of the machine and provided with a longitudinal slot and with a rearwardly curved end, a rod projecting into the curved end of the tube, a flexible device extending slidingly through the tube and attached at one end to said rod, a collar fitting slidingly in the tube and upon said flexible device, a part rigid with the collar fitting slidingly in said slot, a spacer fitting slidingly in the tube and around the said flexible device and movable endwise therewith, means pivotally connected to the headlight and said collar, and means to move said rod endwise in one direction or the other.

4. The combination with an automobile provided with a pair of headlights pivoted for lateral movement, of a suitably-supported tube extending transversely of the machine and provided with a longitudinal slot, an endwise slidable device in said tube, a pair of collars fitting slidingly in the tube and rigidly upon the said device therein, means rigid with the collars and slidable in the slot of the tube, means for imparting endwise movement to the said device in one direction or the other, and means whereby movement of the collars with the said device shall turn the headlights simultaneously in the same direction.

In testimony whereof we affix our signatures, in the presence of two witnesses.

HERSCHEL M. HERROLD.
CRESSE P. RHOADS.

Witnesses:
 FRANK R. GLOVE,
 G. Y. THORPE.